July 3, 1962

CHARLES P. YAMOKOSKI ETAL 3,042,102

COLLAPSIBLE DRUM FOR BUILDING TIRES
AND OTHER ANNULAR ARTICLES

Filed April 27, 1960

INVENTORS
CHARLES P. YAMOKOSKI
PAUL L. SUNTHIMER
JOSEPH E. BRINZA
BY Oldham & Oldham
ATTYS.

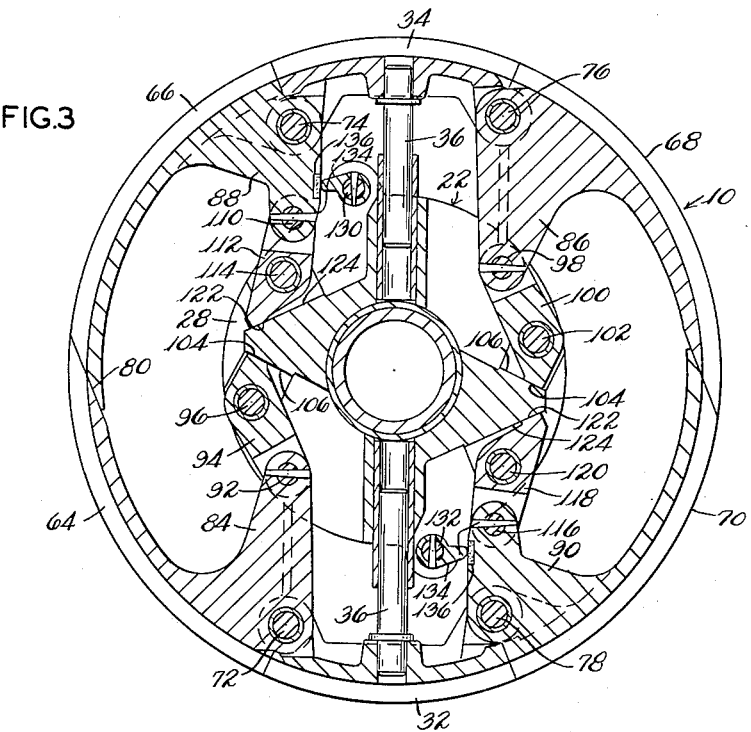

United States Patent Office 3,042,102
Patented July 3, 1962

3,042,102
COLLAPSIBLE DRUM FOR BUILDING TIRES AND OTHER ANNULAR ARTICLES
Charles P. Yamokoski, Cuyahoga Falls, Paul L. Sunthimer, Stow, and Joseph E. Brinza, Cleveland, Ohio, assignors to Superior Mold & Die Company, Stow, Ohio, a corporation of Ohio
Filed Apr. 27, 1960, Ser. No. 25,097
9 Claims. (Cl. 156—420)

This invention relates to collapsible drums, and, more particularly, is concerned with collapsible tire building drums and the like.

Heretofore, various types of collapsible tire building drums have been proposed and provided, these taking a wide variety of styles, form, and types. However, many known drums are open to the objection that they incorporate a very considerable number of parts adding to the expense of building and maintaining the drums. Other known drums are open to the objection that they do not collapse sufficiently to allow the constructed tire to be readily removed therefrom, and still other known drums have proven difficult to collapse or expand.

It is the general object of the present invention to avoid and overcome the foregoing and other difficulties of and objections to known collapsible drum constructions by the provision of a relatively simple, inexpensive, readily collapsible and expandible drum, the drum when collapsed readily permitting the removal of the tire built thereon, and with the drum possessing a long life and being substantially maintenance-free.

Another object of the invention is the provision of a collapsible building drum of the character described and adapted to be expanded and collapsed a very large number of times without excessive wear, breakage, or misalignment of the parts resulting.

Another object of the invention is to provide an improved tire building drum in which the drum is locked in expanded condition and wherein the drum can be expanded or collapsed by inertia and/or centrifugal force or by positive external mechanism readily applied to the drum parts by an adapter.

Another object of the invention is the provision of a tire building drum possessing the advantages enumerated but likewise being particularly strong and rigid when expanded so that tires built thereon are of extremely uniform size over very long periods of operation of the drum.

The foregoing objects of the invention, and other objects which will become apparent as the description proceeds, are achieved by the provision of a collapsible drum for building tires and the like including hub means adapted to be secured to a driving shaft, said hub means comprising a sleeve, a hub-like member integrally formed on one end of the sleeve and a second hub-like member secured to the other end of the sleeve, a spool means rotatively mounted for limited arcuate movement on the sleeve of the hub means between the hub-like members thereof, a pair of arcuately short, diametrically opposed main segments of a drum, post means secured to each main segment and slidably received for radial movement in and out of the ends of the spool means, link means pivotally connecting the ends of the main segments to the hub-like members to move the segments inwardly upon limited arcuate movement of the hub means in a relation to the spool means, four more segments completing the periphery of the drum, each segment being pivotally secured along one edge of a main segment to form a pair of segments extending to and between each side of the main segments, each pair of segments having bevel cut overlapping ends, each of said four segments having a pair of inwardly-directed, integral bell cranks extending substantially parallel with the post means, links pivotally secured to the spool means and to the bell cranks and having end portions extending into engagement with the spool means to limit the outward movement of the four segments, lock means engaging with the bell cranks to hold the segments in expanded drum forming position, and cam means for releasing the lock means during the first portion of the relative movement between the hub means and the spool means whereby continued relative movement moves each of the four segments pivotally inwardly about the edges of the main segments and moves the main segments bodily inwardly on the post means.

For a better understanding of the invention reference should be had to the accompanying drawings wherein FIG. 1 is an end elevation of a building drum incorporating the principles of the invention;

FIG. 3 is a diametric cross-sectional view of the expanded building drum taken substantially on line 3—3 of FIG. 2;

FIG. 4 is a view similar to FIG. 3 but illustrating the drum collapsed; and

FIG. 5 is a longitudinal cross-sectional view taken substantially on line 5—5 of FIG. 2 and illustrating details of the adapter for effecting positive collapsing and expanding movement of the drum parts.

Figure 1:
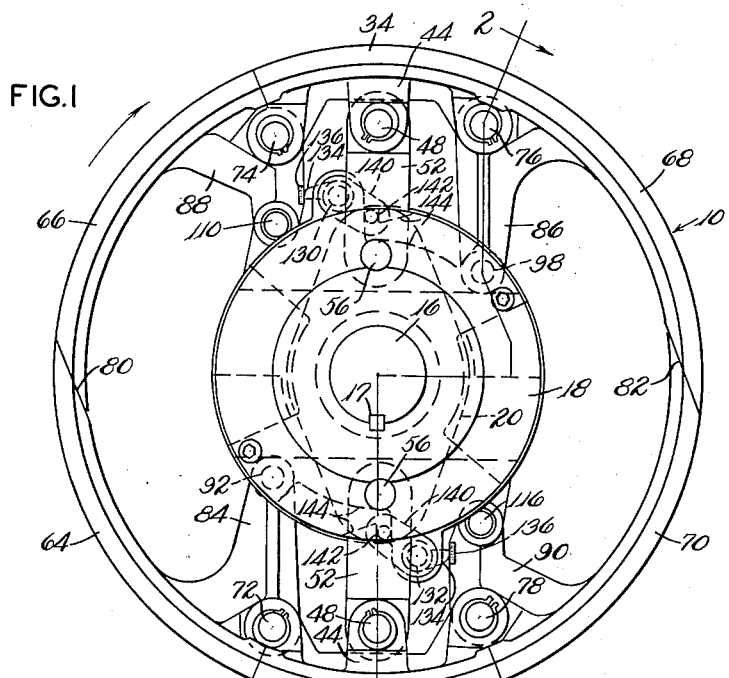

Now having more specific reference to the drawings, the collapsible building drum of the invention is indicated as a whole by the numeral 10 and includes a hub means indicated as a whole by the numeral 12. The hub means 12 comprises a sleeve 14 adapted to slidably receive and be secured to a drum supporting and driving shaft 16, this connection normally being obtained by means of splines, or by a key 17. Formed integral with the sleeve 14 and constituting part of the hub means 12 is a hub-like member 18 at one end of the sleeve, and keyed to the other end of the sleeve 14 is a second hub-like member 20. Whereas the hub-like member 18 is normally made substantially circular in cross section, the hub-like member 20 is preferably made of a diamond-shape (see dotted line showing of FIG. 1) for purposes hereinafter more fully set forth. FIG. 2 shows in cross section the long dimension of the diamond of member 18, whereas FIG. 5 shows the shorter dimension of the diamond of member 20.

Journalled on the sleeve 14 of the hub means 12 and positioned between the hub-like members 18 and 20 of the hub means 12 are spool means indicated as a whole by the numeral 22. Bushings 24 may be provided between the spool means 22 and the hub means 12 to improve the rotary bearing support between these parts. The spool means 22, so designated because of its spool shape in longitudinal section, has substantially circular spool ends 26 and 28 formed integrally with a sleeve portion 30 connecting the spool ends together. The spool means 22 has limited arcuate movement in relation to the hub means 12, all as hereinafter more fully pointed out.

A pair of arcuately short, diametrically opposed main drum segments 32 and 34 are mounted for radial movement in relation to the spool ends 26 and 28 but are held against rotary movement with respect thereto. This is conveniently achieved by providing longitudinally-spaced radially inwardly directed posts 36 on each of the drum segments 32 and 34, these posts being locked in relation to the drum segments by means of set screws 38 as best seen in FIG. 2. The posts 36 are slidably received in radially directed suitably bushed holes 40 in the spool ends 26 and 28.

Controlling the radial position of the drum segments 32 and 34 and the movement of the posts 36 into and out of the holes 40 to a greater and less amount are link means pivotally connecting the drum segments 32 and 34 with the hub-like members 18 and 20. More specifically, and having reference to the lower portion of FIG. 2, only the connection of main drum segment 32 to the hub means 12 will be described, it being understood that the connection of the drum segment 34 to the hub means 12 is identical. Each end of the drum segment 32 is provided with integral clevis portions 42 and 44 through which extend pins 46 and 48 pivotally securing links 50 and 52 to the clevis portions 42 and 44. The pins 46 and 48 are secured in the clevises in any desired manner, as by the provision of snap rings resiliently fitting down into grooves cut in the ends of the pins.

The other ends of links 50 and 52 are pivotally secured by pins 54 and 56 to clevis portions 58 and 60 formed respectively in the hub-like members 20 and 18. The pivot pins 54 and 56 are conveniently secured in place by means of set screws 62.

Figure 2:
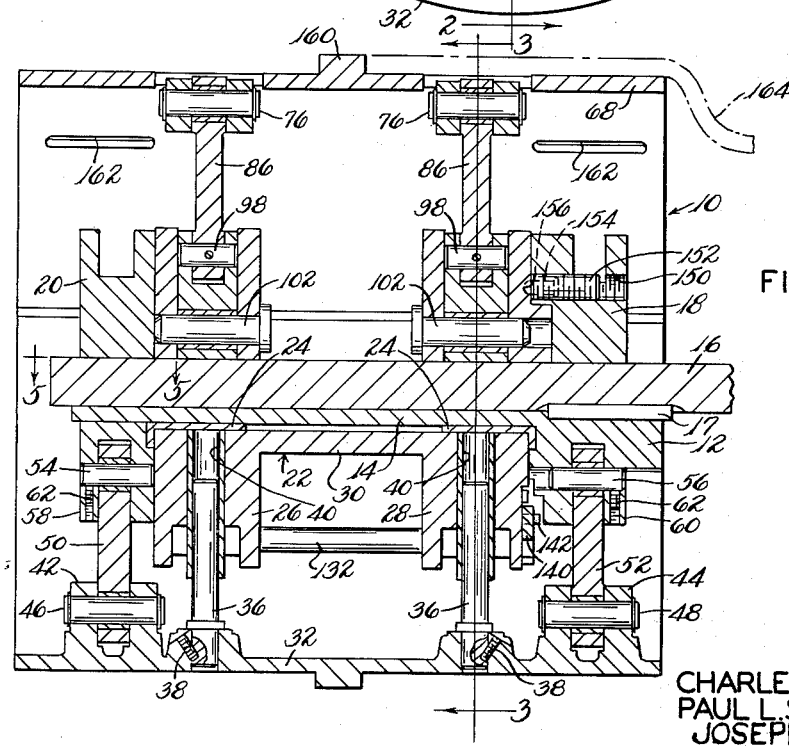
FIG. 2 is a longitudinal sectional view of the drum of FIG. 1 and taken substantially on line 2—2 thereof.

FIG. 1 illustrates in end elevation the position of the parts described in the preceding paragraph, and like numerals have been employed for designating the like parts for the mounting and movement of main drum segment 34.

It will be understood that from the mechanism just described relative to the mounting of the main drum segments 32 and 34 that with the shaft 16 and hub means 12 held stationary the rotation of the drum segments in the direction shown by the rotation arrow in FIG. 1 causes the spool means 22 to move a limited arcuate amount in the direction of the rotation arrow thus moving the main drum segments 32 and 34 radially inwardly on the posts 36, this radial inward movement being effected by the links 50 and 52 swinging about their respective pivot pins to bring the main drum sections 32 and 34 to the collapsed position shown in FIG. 4.

Four more segments complete the periphery of the building drum, and these auxiliary segments are identified by the numerals 64, 66, 68 and 70. The drum segment 64 is pivotally secured by a pair of axially aligned but longitudinally spaced pins 72 to clevis portions formed on the edge of the main drum segment 32, and in like manner drum segment 66 is pivotally secured by pins 74 to the edge of main drum segment 34, drum segment 68 is pivotally secured by pins 76 to the other edge of main drum segment 34, and drum segment 70 is pivotally secured by pins 78 to the other edge of main drum segment 32. The drum segments 64 and 66 are provided with overlapping beveled ends, indicated at 80, and in similar fashion the drum segments 68 and 70 are provided with overlapping beveled ends indicated at 82.

The drum segment 64 is provided with a pair of longitudinally spaced inwardly directed integral bell-crank portions 84, and the diametrically opposite drum segment 68 is provided with a pair of similar integral bell-crank portions 86. In like manner, the drum segment 66 is formed with an integral inwardly directed, longitudinally spaced pair of bell-crank portions 88 of somewhat shorter length, and the diametrically opposite drum segment 70 is formed with a pair of longitudinally spaced integral bell-crank portions 90 similar to those at 88.

The bell-cranks 84 are pivotally secured by pins 92 to links 94 pivotally secured by pins 96 to clevis portions provided in the ends 26 and 28 of the spool means 22. In a like manner, bell-cranks 86 are pivotally secured by pins 98 to links 100 pivotally secured by pins 102 to clevis portions provided in the spool ends 26 and 28 of spool means 22. It will be noted that each one of the links 94 and 100 have end portions indicated at 104 which abut against inclined faces 106 formed on the spool means 22 to thereby limit the outer expanding movement of the drum segments.

In a like manner, the shorter bell-crank portions 88 are pivotally secured by pins 110 to links 112 pivotally secured by pins 114 to clevis portions provided in the spool ends 26 and 28 of spool means 22. Bell-crank portions 90 are pivotally secured by pins 116 to links 118 in turn pivotally secured by pins 120 to clevis portions on the spool ends 26 and 28 of the spool means 22. Links 112 and 118 are provided with portions 122 which abut against inclined faces 124 of the spool means 22 to limit the outward or expanding movement of the drum segments 66 and 70. Note that the short bell-crank and link connections defined by the pivot pins 74—110—114 and by pivot pins 120—116—78 define toggles in which the three pivot points of the toggles are much more nearly in line than are the toggles defined by the larger bell-crank portions 84 and 86.

Lock means are provided to hold the drum assembly in expanded position, and these means are conveniently associated with the short bell-crank portions 88 and 90 when the toggle portions thereof are in expanded position with the toggle portions substantially in line, as before explained. More specifically, a pair of shafts 130 and 132 are pivotally mounted on and extend between the spool ends 26 and 28 of the spool means 22, and each of these shafts has pinned thereto fingers 134 adjacent each bell-crank 88 and 90, the fingers 134 contacting wear plates 136 inset into the bell-cranks. The fingers 134 extend substantially perpendicularly between the shafts 130—132 and the bell-crank portions 88 and 90 when the drum is in fully expanded position, all as seen in FIG. 3.

The locking fingers 134 must be moved out of the way before the drum can be collapsed, and this is achieved by securing an arm 140 to the right-hand end of each shaft 130 and 132 (as seen in FIG. 2), the arms 140 carrying pins 142 at their outer ends which pins, as seen in dotted lines in FIG. 1, ride in slots 144 cut in the side of the hub-like member 18.

Looking at the showing of the locking means at the top of FIG. 1, and with the parts in the positions illustrated, when a force beyond a selected maximum is applied to effect relative rotation between the hub means 12 and the spool means 22, then pin 142 engages with the substantially vertical portion of the upper side of slot 144 and the pin 142 moves vertically downward to rock shaft 130 and swing finger 134 upwardly out of locking position. Pin 142 has by this time moved to the wide portion of slot 144 and locking is no longer effected. It will be recognized that the more perpendicular the line of force is made forcing the pin 142 against the vertical portion of the slot 144 the greater is the force required to overcome the locking action, and normally this line of force is kept between about 15 and about 35 degrees from the vertical to the vertical portion of slot 144.

It is preferable to provide some means for holding the drum in fully collapsed position with a resistive force, and the drum can be held also in a fully expanded position with a resistive force. By a resistive force is meant a force strong enough to normally hold the drum collapsed or expanded, but with this force being of an amount which can be overcome when it is desired to expand or collapse the drum. To this end, a spring pressed detent is provided between the hub-like member 18 of hub means 12 and the spool end 28 of spool means 22. More specifically, and having reference to FIGS. 1 and 2, the hub-like member 18 is provided with a tapped hole 150 adjustably receiving an Allen set screw 152 carrying a spring detent 154 and holding a ball thereof with a selected force in a recess 156 in the end of the spool end 28 of the spool means 22. A recess of desired depth is provided at the end of the collapsing movement and at the end of the expanding movement between the hub means 12 and the spool means 22, and an arcuate groove somewhat shallower than the recesses at the ends of the groove allows movement of the spring detent during relative arcuate movement between hub means 12 and the spool means 22.

FIG. 2 illustrates the cross section of the drum segments 32 and 62, and indicates that each of these drum sections has a circumferentially extending radially outward positioned central rib 160 thereon, and with the drum segments being formed with axially parallel slots 162 best seen at the top of FIG. 2.

In actual use of the drum of the invention each drum segment normally carries portions which complete the outer surface of the drum, these segments being adjustable to vary the drum width or removable and replaceable to allow different drum shapes to be substituted. A typical filler portion for one side of the drum segment is indicated in chain dotted lines by the numeral 164, it being understood that segments of this type are normally bolted to the drum segments shown to complete the contour of the drum for actual tire building use.

In the operation of the apparatus as described with the drum in the expanded position shown in FIG. 3 and rotating at a fairly high rate of speed, for example, that achieved at the end of a tire building operation, the drive shaft 16 is braked, and the mass and momentum of the drum tends to turn the drum segments and spool means ahead of the hub means 12 in the direction of the arrow of FIG. 1. This first causes the locking fingers 134 to be swung out of the way in the manner heretofore described, then causes the links 50 and 52 to swing the main drum sections 32 and 34 inwardly on the posts 36 this causing drum segments 66 and 70 to pivot radially inward followed by the inward pivot movement of drum segments 64 and 68 to position the drum in the collapsed position seen in FIG. 4.

Expanding the drum from the collapsed position of FIG. 4 to the expanded position of FIG. 3 involves a mere reversal of the operation just described. Specifically, with the drum in the collapsed position when the motor driving the shaft 16 is started this partially turns the hub means 22 arcuately in relation to the spool means 22 and the drum segments carried thereby, and the inertia of the spool means 22 and the drum segments is such that the drum parts move back to expanded position. During the expanding movement of the drum the drum sometimes turns several revolutions before a combination of its inertia and the centrifugal force beginning to build up upon the parts thereof snaps the drum parts out to expanded form.

It is sometimes advisable to have a positive means for expanding and collapsing the drum, and not to rely upon inertia and/or centrifugal force. For this purpose there is illustrated in FIG. 5 an adapter, indicated as a whole by the numeral 170 which can be attached, for example, over the end of the shaft at the left of FIG. 2. The adapter 170 includes a ring portion 172 adapted to surround the end of the shaft 16 and a yoke portion 174 straddling the narrowest axis of the diamond shaped hub member 20 with sufficient clearance to have relative angular movement in relation thereto and to the extent of the relative angular movement between the hub means 12 and the spool means 22. The diametrically opposed yoke portions 174 of the adapter 170 are adapted to be secured, as by pins 175 and/or cap screws 176 to the end 26 of the spool means 22, and the adapter is provided with means for securing it, as by splines 178 to an external brake (not shown) and forming a part of the tire building machine or the like.

With the brake applied to the adapter 170 and a reverse drive applied to the shaft 16 the drum can be positively collapsed. Alternatively, the shaft 16 can be held and the adapter 170 can be frictionally driven in the direction of the rotation arrows in FIG. 1 to positively collapse the drum.

Moreover, it should be understood that adapter means can be provided at the other end of the shaft 16 to effect the positive collapsing of the drum, the exact manners of application of the adapter 170 to one end of the shaft or the other, and even the necessity for its use at all being dependent upon the particular application of the drum of the invention to a specific tire building machine, and to the requirements of the customer. Reversal of the operations described effect the positive expansion of the drum, as will be understood.

While in accord with the patent statutes one specific embodiment of the invention has been particularly illustrated and described, it is to be specifically understood that the invention is not limited thereto or thereby but that its scope is defined in the appended claims.

What is claimed is:

1. A collapsible drum for building tires and other annular articles including hub means adapted to be secured to a driving shaft, said hub means comprising a sleeve, a hub-like member built integrally on one end of the sleeve and a second hub-like member secured to the other end of the sleeve, a spool means rotatively mounted for limited arcuate movement on the sleeve of the hub means between the hub-like members thereof, a pair of arcuately short, diametrically opposed main segments of a drum, post means secured to each main segment and slidably received for radial movement in and out of the ends of the spool means, link means pivotally connecting the ends of the main segments to the hub-like members to move the segments inwardly upon limited arcuate movement of the hub means in relation to the spool means, four more segments completing the periphery of the drum, each segment being pivotally secured along one edge of a main segment to form a pair of segments extending to and between each side of the main segments, each pair of segments having bevel cut overlapping ends, each of said four segments having a pair of inwardly directed, integral bell-cranks extending substantially parallel with the post means, links pivotally secured to the spool means and to the bell-cranks and having end portions extending into engagement with the spool means to limit the outward movement of the four segments, lock means carried by the spool means and engaging with the bell-cranks to hold the segments in expanded drum forming position, and cam means operatively connecting the lock means to a hub-like member for releasing the lock means during the first portion of the relative movement between the hub means and the spool means whereby continued relative movement moves each of the four segments pivotally inwardly about the edges of the main segments and moves all of the segments bodily inwardly on the post means.

2. A collapsible drum for building tires and other annular articles including hub means adapted to be secured to a driving shaft, said hub means comprising a sleeve, a hub-like member integral with one end of the sleeve and a second hub-like member secured to the other end of the sleeve, a spool means rotatively mounted for limited arcuate movement on the sleeve of the hub means between the hub-like members thereof, a pair of arcuately short, diametrically opposed main segments of a drum, post means secured to each main segment and slidably received for radial movement in and out of the ends of the spool means, link means pivotally connecting the ends of the main segments to the hub-like members to move the segments inwardly upon limited arcuate movement of the hub means in relation to the spool means, four more segments completing the periphery of the drum, each segment being pivotally secured along one edge of a main segment to form a pair of segments extending to and between each side of the main segments, each pair of segments having bevel cut overlapping ends, each of said four segments having a pair of inwardly directed, integral bell-cranks extending substantially parallel with the post means, links pivotally secured to the spool means and to the bell cranks to move all of the four segments positively by relative arcuate movement of the spool means on the hub means, lock means carried by the spool means to hold the segments in expanded drum forming position, and means operatively connecting the lock means to the hub means for releasing the lock means upon initial relative movement of the hub means and spool means.

3. A collapsible drum for building tires and other annular articles including hub means adapted to be secured to a driving shaft, said hub means comprising a sleeve, a hub-like member secured to one end of of the sleeve and a second hub-like member secured to the other end of the sleeve, a spool means rotatively mounted for limited arcuate movement on the sleeve of the hub means between the hub-like members thereof, a pair of arcuately short, diametrically opposed main segments of a drum, means connected between and mounting the main segments on the spool means for radial movement in and out thereon but holding the main segments against relative rotary movement on the spool means, link means pivotally connecting the ends of the main segments to the hub-like members to move the segments inwardly upon limited arcuate movement of the hub means in relation to the spool means, four more segments completing the periphery of the drum, each segment being pivotally secured along one edge of a main segment to form a pair of segments extending to and between each side of the main segments, each pair of segments having bevel cut overlapping ends, each of said four segments having a pair of inwardly directed, integral bell-cranks, links pivotally secured to the spool means and to the bell-cranks, lock means operatively connecting the spool means and the bell cranks to hold the segments in expanded drum forming position, and means operatively connecting the lock means to a hub-like member for releasing the lock means upon initial relative arcuate movement of the hub means and spool means.

4. A collapsible drum for building tires and other annular articles including hub means adapted to be secured to a driving shaft, a spool means rotatively mounted for limited arcuate movement on the hub means, a pair of arcuately short, diametrically opposed main segments of a drum, means connected between and mounting the main segments on the spool means for radial movement in and out thereon but holding the main segments against relative rotary movement on the spool means, link means pivotally connecting the ends of the main segments to the hub means to move the segments inwardly upon limited arcuate movement of the hub means in relation to the spool means, four more segments completing the periphery of the drum, each segment being pivotally secured along one edge of a main segment to form a pair of segments extending to and between each side of the main segments, each pair of segments having bevel cut overlapping ends, each of said four segments having a pair of inwardly directed, integral bell-cranks, links pivotally secured to the spool means and to the bell-cranks, and releasable lock means operatively connected between the spool means and the hub means to hold the segments in expanded drum forming position.

5. A collapsible drum for building tires and other annular articles including hub means adapted to be secured to a driving shaft, said hub means comprising a sleeve, a hub-like flywheel member secured to one end of the sleeve and a second hub-like member secured to the other end of the sleeve, a spool means rotatively mounted for limited arcuate movement on the sleeve of the hub means between the hub-like members thereof, a pair of arcuately short, diametrically opposed main segments of a drum, post means secured to each main segment and slidably received for radial movement in and out of the ends of the spool means, link means pivotally connecting the ends of the main segments to the hub-like members to move the segments inwardly upon limited arcuate movement of the hub means in relation to the spool means, four more segments completing the periphery of the drum, each segment being pivotally secured along one edge of a main segment to form a pair of segments extending to and between each side of the main segments, each pair of segments having bevel cut overlapping ends, each of said four segments having a pair of inwardly directed, integral bell-cranks extending substantially parallel with the post means, and links pivotally secured to and extending between the spool means and the bell-cranks and having end portions extending into engagement with the spool means to limit the outward movement of the four segments.

6. A collapsible drum for building tires and other annular articles including hub means adapted to be secured to a driving shaft, a spool means rotatively mounted for limited arcuate movement on the hub means, a pair of arcuately short, diametrically opposed main segments of a drum, post and sleeve means mounting the main segments on the spool means for radial movement in and out thereon but holding the main segments against relative rotary movement on the spool means, link means pivotally connecting the ends of the main segments to the hub means to move the segments inwardly upon limited arcuate movement of the hub means in relation to the spool means, four more segments completing the periphery of the drum, each segment being pivotally secured along one edge of a main segment to form a pair of segments extending to and between each side of the main segments, each pair of segments having bevel cut overlapping ends, each of said four segments having a pair of inwardly directed, integral bell-cranks, and links pivotally secured to the spool means and to the bell-cranks for collapsing movement of the four segments upon relative arcuate movement of the spool means and hub means.

7. A collapsible drum for building tires and other annular articles including hub means adapted to be secured to a driving shaft, said hub means comprising a sleeve, a hub-like member built integrally on one end of the sleeve and a second hub-like member secured to the other end of the sleeve, a spool means rotatively mounted for limited arcuate movement on the sleeve of the hub means between the hub-like members thereof, a pair of arcuately short, diametrically opposed main segments of a drum, post means secured to each main segment and slidably received for radial movement in and out of the ends of the spool means, link means pivotally connecting the ends of the main segments to the hub-like members to move the segments inwardly upon limited arcuate movement of the hub means in relation to the spool means, four auxiliary segments completing the periphery of the drum, each auxiliary segment being pivotally secured to a main segment along one edge to form a pair of segments extending from the sides of the main segments and combining with the auxiliary segments on the other main segment to complete the drum, each of said four auxiliary segments having a pair of inwardly directed, integral bell-cranks thereon and with the bell-cranks on two of the diametrically opposed auxiliary segments being smaller than the other bell-cranks for faster movement of the auxiliary segments having the shorter bell-cranks thereon, links pivotally secured to the spool means and to the bell-cranks and having end portions extending into engagement with the spool means to limit the outward movement of the four auxiliary segments, lock means carried by the spool means and engaging the bell-cranks to hold the segments in expanded drum forming position, and cam means operatively connecting the lock means to the hub means for releasing the lock means during the first portion of the relative movement between the hub means and the spool means whereby continued relative movement positively moves each of the four segments pivotally inwardly about the edges of the main segments and moves all of the segments bodily inwardly on the post means, movement of all of the auxiliary segments being positively controlled and with the longer bell-cranks moving slower than the short bell-cranks to fold the auxiliary segments connected thereto inwardly to be positioned radially outwardly of the auxiliary segments to which the shorter bell-cranks are connected.

8. A collapsible drum for building tires and other annular articles including hub means adapted to be secured to a driving shaft, said hub means comprising a sleeve, a hub-like member at both ends of the sleeve, a spool means rotatively mounted for limited arcuate movement on the sleeve of the hub means between the hub-like members thereof, a pair of arcuately short, diametrically opposed main segments of a drum, post means secured to each main segment and slidably received for radial movement in and out of the ends of the spool means, link means pivotally connecting the main segments to the hub-like members to move the segments inwardly upon limited arcuate movement of the hub means in relation to the spool means, four auxiliary segments completing the periphery of the drum, each auxiliary segment being pivotally secured to a main segment along one edge to form a pair of segments extending from the sides of the main segments and combining with the auxiliary segments on the other main segment to complete the drum, each of said four auxiliary segments having a pair of inwardly directed, integral bell-cranks thereon and with the bell-cranks on two of the auxiliary segments being smaller than the other bell-cranks for initial movement of the smaller bell-cranks and the segments connected thereto, links pivotally secured to the spool means and to the bell-cranks and having end portions extending into engagement with the spool means to limit the outward movement of the four segments, relative movement between the hub means and the spool means moving each of the four segments pivotally inwardly about the edges of the main segments and moving all of the segments bodily inwardly on the post means, movement of all of the segments being positively controlled, the adjacent edges of the auxiliary segments being beveled and having overlapping portions with the radially inner overlapping portion segments having the shorter bell-cranks connected thereto.

9. A collapsible drum as in claim 4 where the bell-cranks and links connecting thereto and the pivotal connections of the four segments to the main segments form toggles, the toggles for a pair of opposed segments having their pivot points more nearly in line in operative position than the toggles for the other opposed segments for initial collapsing movement of such pair of opposed segments.

References Cited in the file of this patent

UNITED STATES PATENTS

| | | |
|---|---|---|
| 1,835,986 | Heston | Dec. 8, 1931 |
| 2,073,291 | Templeton | Mar. 9, 1937 |
| 2,201,469 | Bostwick | May 21, 1940 |